United States Patent
Blatchley, Sr.

(10) Patent No.: US 9,212,650 B2
(45) Date of Patent: Dec. 15, 2015

(54) WATER DRIVEN MECHANICAL POWER PLANT

(71) Applicant: Kraig Daniel Blatchley, Sr., Ridgeland, SC (US)

(72) Inventor: Kraig Daniel Blatchley, Sr., Ridgeland, SC (US)

( * ) Notice: Subject to any disclaimer, the term of this patent is extended or adjusted under 35 U.S.C. 154(b) by 219 days.

(21) Appl. No.: 13/747,418

(22) Filed: Jan. 22, 2013

(65) Prior Publication Data

US 2013/0186081 A1 Jul. 25, 2013

Related U.S. Application Data

(60) Provisional application No. 61/589,264, filed on Jan. 20, 2012.

(51) Int. Cl.
  *F03B 17/00* (2006.01)
  *F03G 3/00* (2006.01)
  *F03G 7/00* (2006.01)

(52) U.S. Cl.
  CPC . *F03B 17/00* (2013.01); *F03G 3/00* (2013.01); *F03G 7/00* (2013.01); *Y02E 10/20* (2013.01)

(58) Field of Classification Search
  CPC ....... Y02E 10/20; F03B 17/00; F03B 17/005; F03B 17/02; F03B 17/04; F03B 7/003; Y10S 74/09; Y10S 415/916; F03G 3/00; F03G 7/10; F03G 2730/00; F03G 2730/06
  USPC ............. 60/506, 495, 640, 639; 417/329; 74/DIG. 9; 185/27, 29; 446/166
  See application file for complete search history.

(56) References Cited

U.S. PATENT DOCUMENTS

| | | | | |
|---|---|---|---|---|
| 377,586 | A * | 2/1888 | Thomas et al. | 60/640 |
| 510,826 | A * | 12/1893 | Watkins | 60/640 |
| 547,318 | A * | 10/1895 | Baily | 60/639 |
| 601,906 | A * | 4/1898 | Rudasill | 60/640 |
| 940,312 | A * | 11/1909 | Hanson | 417/329 |
| 2,499,715 | A * | 3/1950 | Blevins | 60/640 |
| 2,583,528 | A * | 1/1952 | Habsch | 417/329 |
| 5,970,713 | A * | 10/1999 | Iorio | 60/640 |
| 2012/0017589 | A1 * | 1/2012 | Ackman | 60/640 |

* cited by examiner

*Primary Examiner* — Thomas Denion
*Assistant Examiner* — Xiaoting Hu

(57) ABSTRACT

A water powered unit design produces clean electricity, moves and lifts water, generates compressed air and can be adapted to several types of mechanical systems to produce energy. The device uses gravitational potential energy and a unique rocking motion to achieve these functionalities. The water powered units can use a rocking motion to lift water above the entry point. The units can produce mechanical energy to generate clean electricity, can create compressed air, can create mechanical energy for other purposes, and can lift water, for example. The units can use flowing water and gravity to produce a completely environmentally safe energy. The units can be located near any gravity fed water source. Once the system is fully charged with water, the units use and reuse the water. Thus, the units use very little water to maintain themselves.

5 Claims, 7 Drawing Sheets

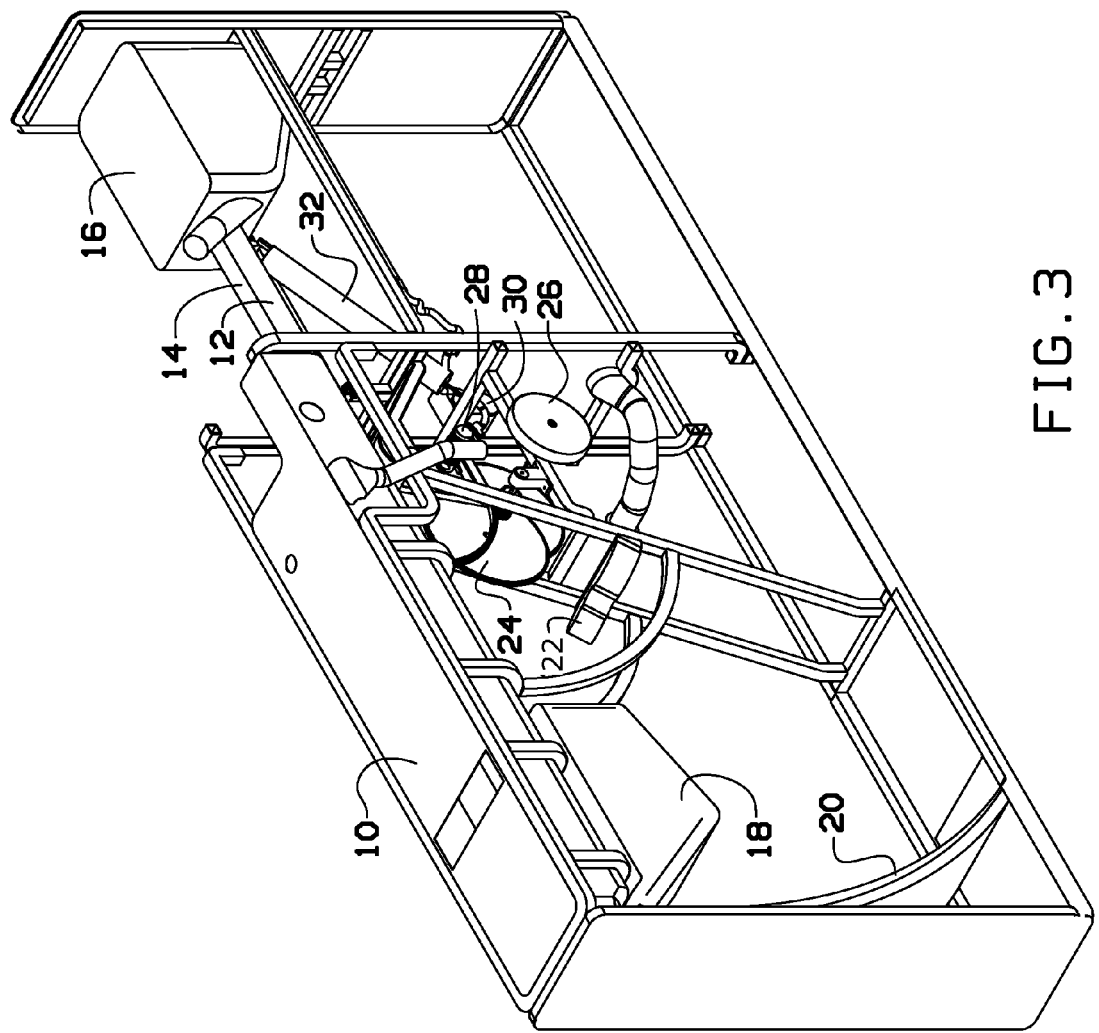

WATER DRIVEN MECHANICAL POWER PLANT

CROSS-REFERENCE TO RELATED APPLICATION

This application claims the benefit of priority of U.S. provisional application No. 61/589,264, filed Jan. 20, 2012, the contents of which are herein incorporated by reference.

BACKGROUND OF THE INVENTION

The present invention relates to power plants and, more particularly, to a water driven mechanical power plant that produces clean electric power, mechanical energy and lifts water.

As the future unfolds, the need for clean, alternative energy is greater than ever. Currently, there are several ways to create power or energy, such as natural gas, oil diesel engines, nuclear power, dams, solar, wind and a few others. However, most of the above have negative side effects, such as radiation, environment hazards, nuclear waste, air and water pollution, ozone depletion, flooding and massive fish kills from dam turbines.

As can be seen, there is a need for improved power that can mitigate the problems associated with most conventional methods of power generation.

SUMMARY OF THE INVENTION

In one aspect of the present invention, a water driven mechanical system comprises a first container receiving flowing water; a second container receiving flowing water after the first container is filled; a fill pipe connecting the first container with the second container, the pipe operable to permit the first container and the second container to pivot on an axis of the fill pipe; one or more mechanical devices driven by the pivoting of the first and second containers, wherein when a predetermined amount of water flows into the second container, the first and second containers pivot on the fill pipe, causing the first container to spill to an elevated location.

In another aspect of the present invention, a water-driven mechanical power plant comprises a plurality of power plant units, a first power plant unit including a first container receiving flowing water; a second container receiving flowing water after the first container is filled; fill pipe connecting the first container with the second container, the pipe operable to permit the first container and the second container to pivot on an axis of the fill pipe; one or more mechanical devices driven by the pivoting of the first and second containers, wherein when a predetermined amount of water flows into the second container, the first and second containers pivot on the fill pipe, causing the first container to spill to a holding tank of a second power plant unit disposed in a location elevated from the first power plant unit.

These and other features, aspects and advantages of the present invention will become better understood with reference to the following drawings, description and claims.

BRIEF DESCRIPTION OF THE DRAWINGS

FIG. 3 is a rear perspective view of the water driven power plant of FIG. 1;

DETAILED DESCRIPTION OF THE INVENTION

Figure 2:
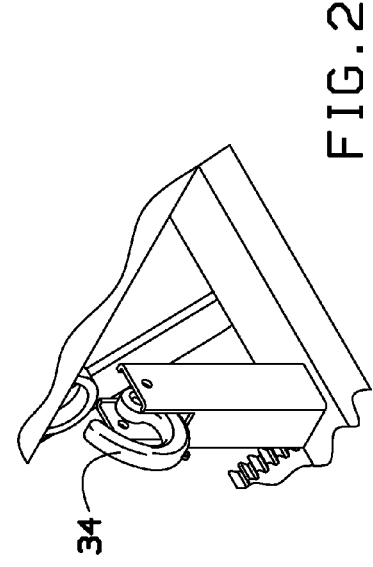
FIG. 2 is a detailed perspective view of a safety latch portion of the water driven power plant of FIG. 1.
Figure 1:
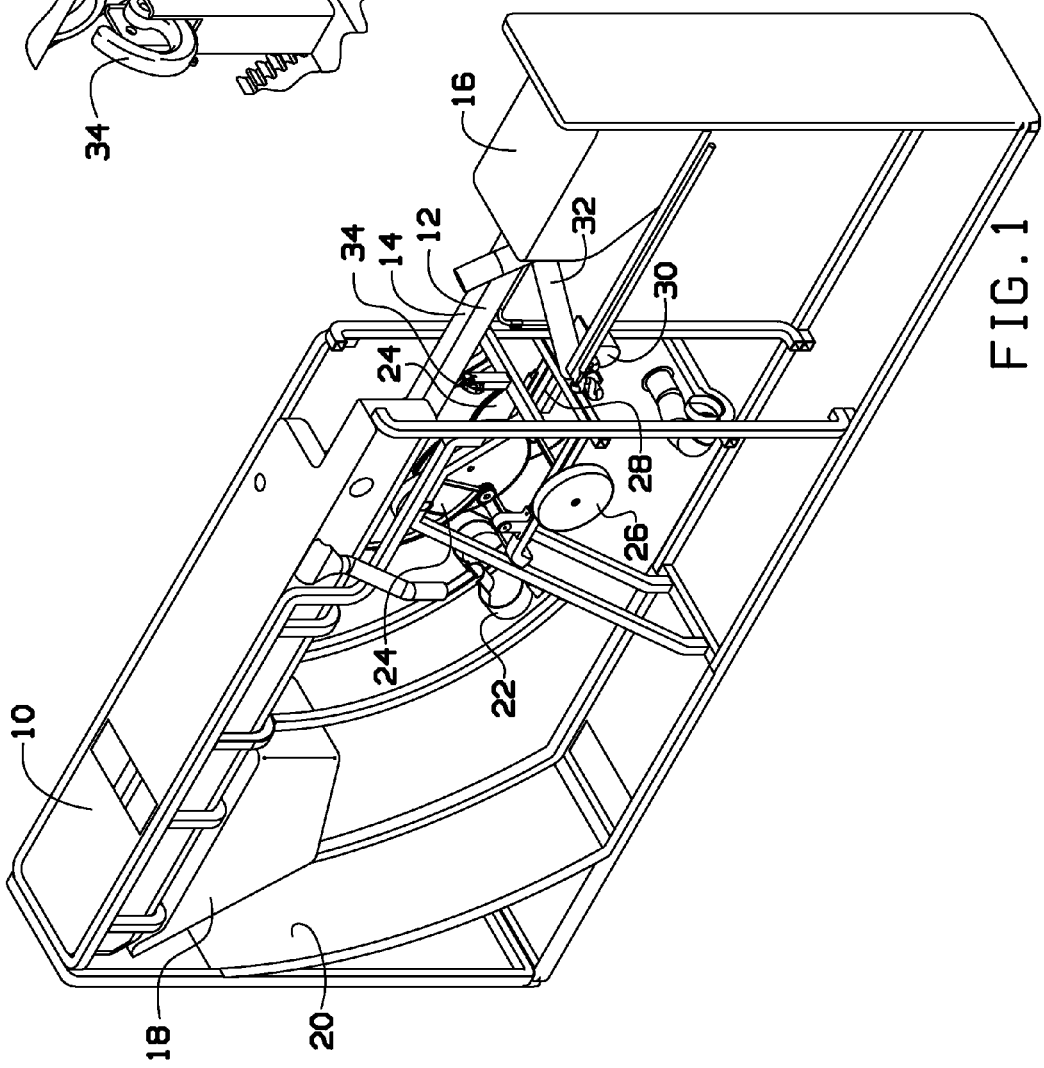
FIG. 1 is a forward perspective view of a water driven power plant according to an exemplary embodiment of the present invention.
Figure 4:
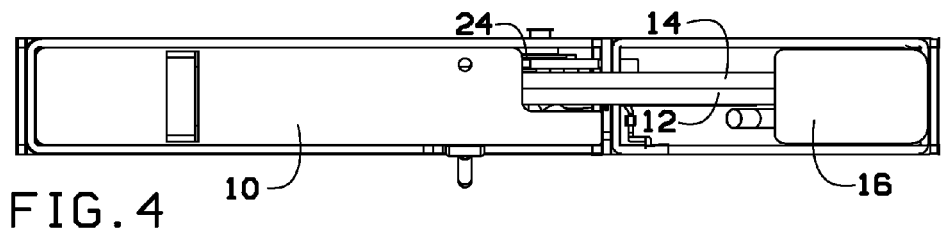
FIG. 4 is a top view of the water driven power plant of FIG. 1.
Figure 5:
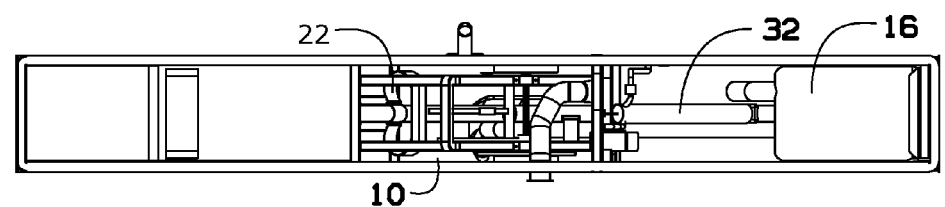
FIG. 5 is a bottom view of the water driven power plant of FIG. 1.
Figure 6:
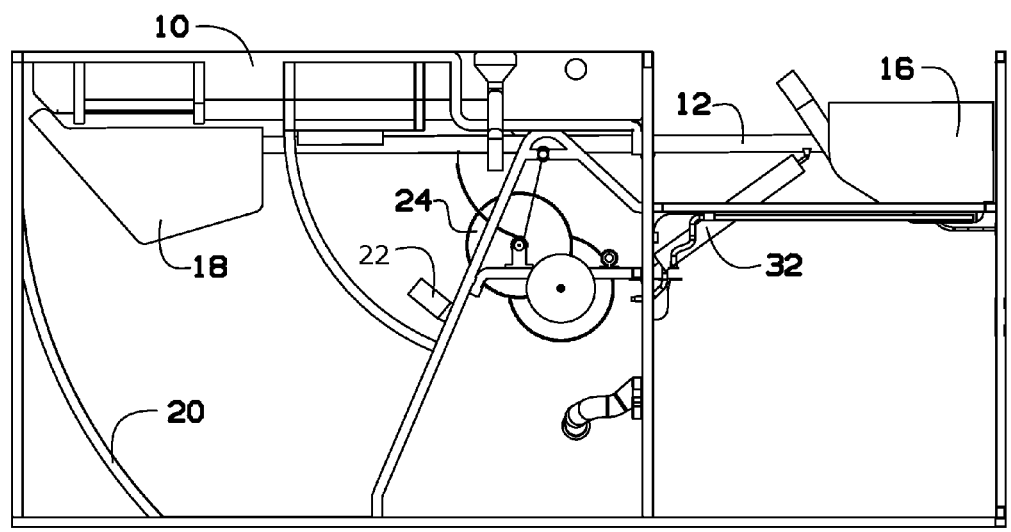
FIG. 6 is a side view of the water driven power plant of FIG. 1.
Figure 7:
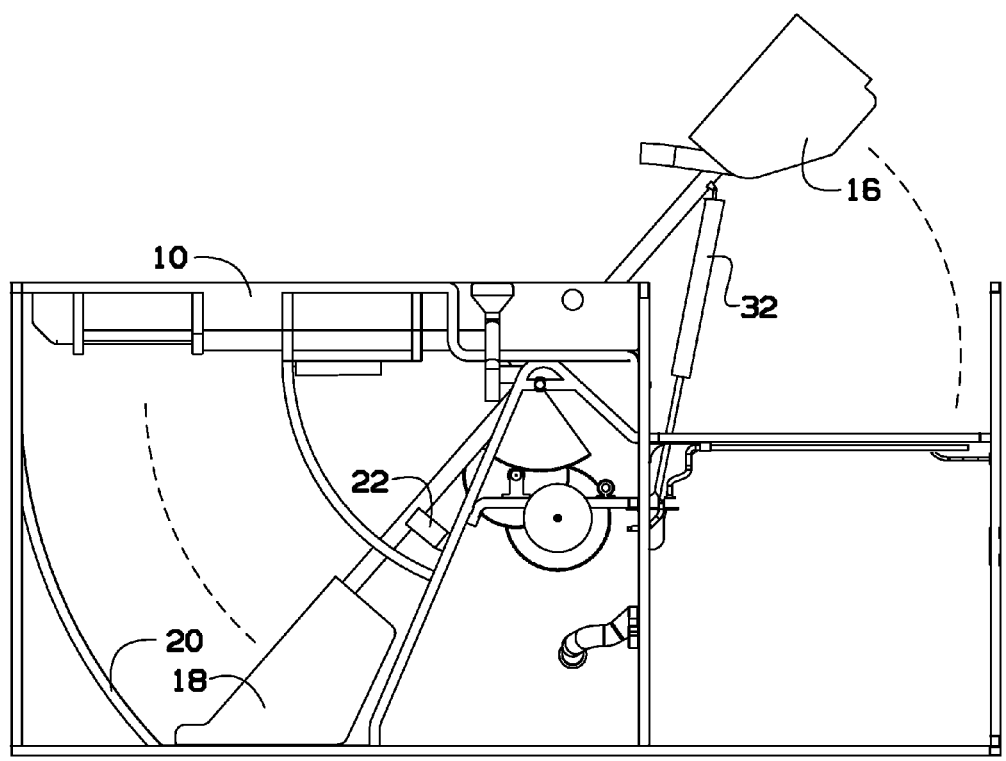
FIG. 7 is a side view of the water driven power plant of FIG. 1, illustrating rotational motion thereof.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a water powered unit design that produces clean electricity, moves and lifts water, generated compressed air and can be adapted to several types of mechanical systems to produce energy. The device uses gravitational potential energy and a unique rocking motion to achieve these functionalities. The water powered units can use a rocking motion to lift water above the entry point. The units can produce mechanical energy to generate clean electricity, can create compressed air, can create mechanical energy for other purposes, and can lift water, for example. The units can use flowing water and gravity to produce a completely environmentally safe energy. The units can be located near any gravity fed water source. Once the system is fully charged with water, the units use and reuse the water. Thus, the units use very little water to maintain themselves.

The magnitude of a torque is the product of the force times the distance to its axis to the point of application. Depending on individual needs, the frame and containers, as described in greater detail below, can be increased or decreased in size to accommodate power needs. Thus, the units can be made in many different sizes. Direct current (DC) motors can be placed on the unit to provide immediate electricity. In other situations, a hydraulic pump can be mounted on the unit and fluid can be sent from hundreds or thousands of units to run a single turbine, for example. Also, a simple air pump can be mounted on the unit for pumping compressed air to run equipment. The units are designed to stack on top of each other vertically, or side-by-side, and are completely environmentally safe.

Referring now to FIGS. 1 through 10, river water may flow through a pipe into the holding tank 10. When the main pipe 12 is in a horizontal position, water can flow freely into a first container 16 through a fill pipe 14. Once the first container 16 has filled almost full, water can then flow through the main pipe 12 and fill a second container 18. A releasable holding mechanism, such as a magnet 35, can hold the second container 18 until it exceeds its limit. Then, the unit can pivot, dropping the second container 18 and lifting the first container 16, resulting in the water exiting out of both of the first and second containers 16, 18. A catch plate 20 may keep water from spilling as the unit starts dumping water.

Figure 8:
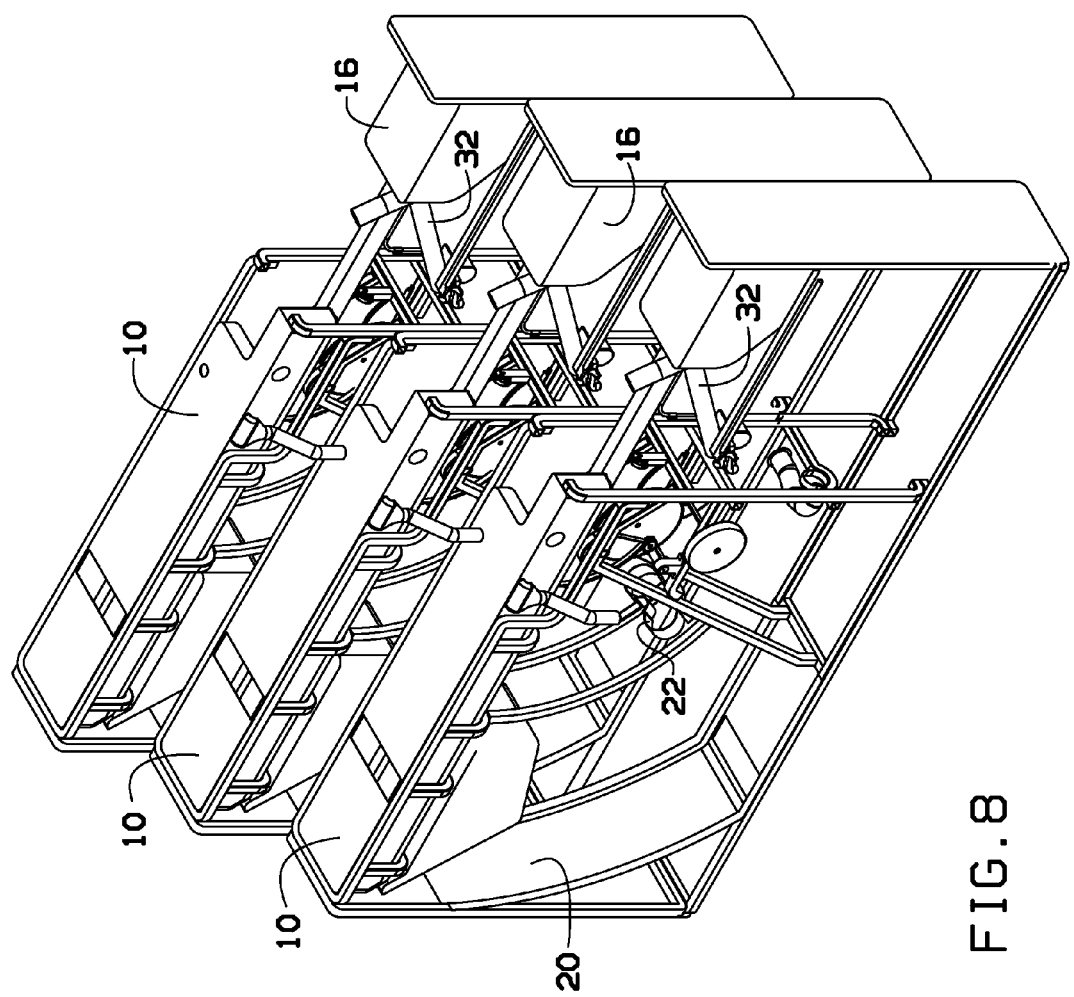
FIG. 8 is a perspective view of multiple water driven power plants of FIG. 1.
Figure 9:
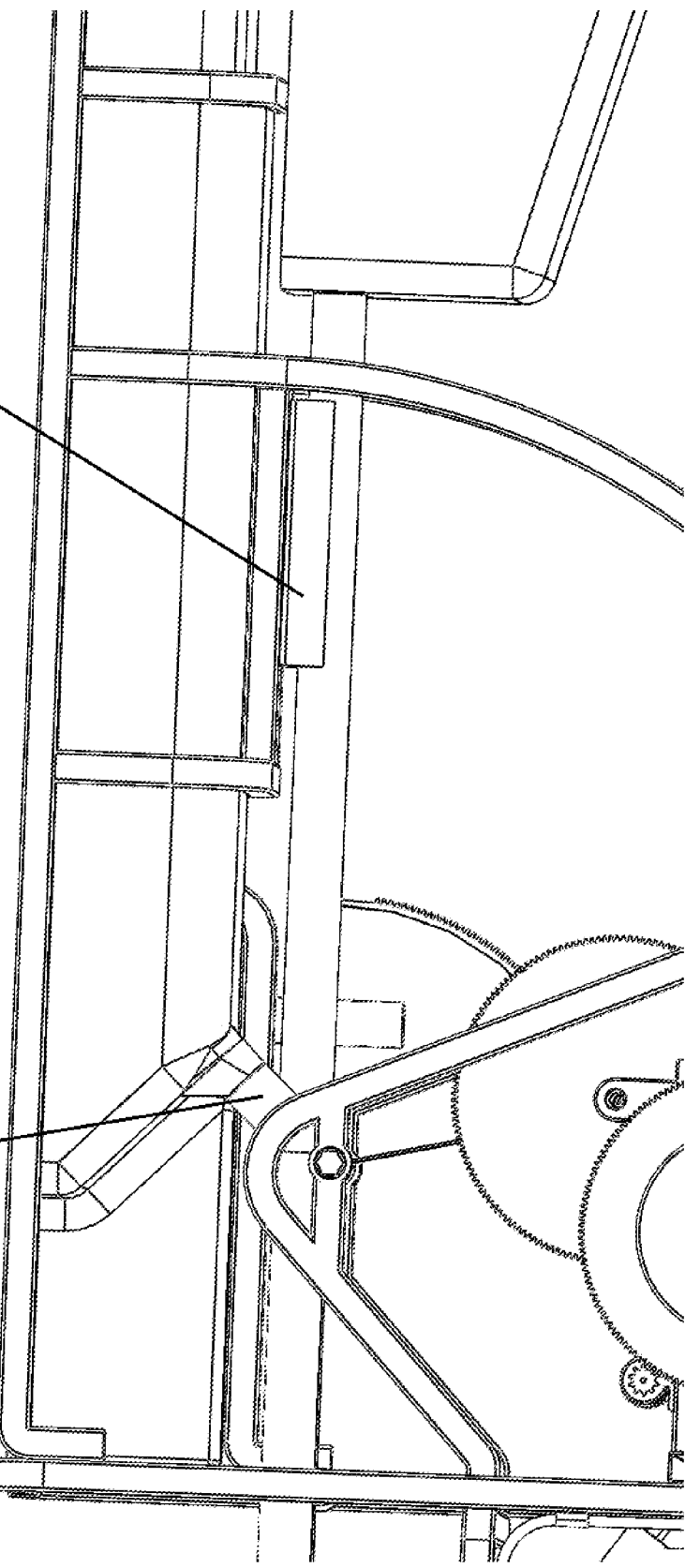
FIG. 9 is a detailed perspective view of a magnet and a flexible connection at the end of the fill pipe of the water driven power plant of FIG. 1.
Figure 10:
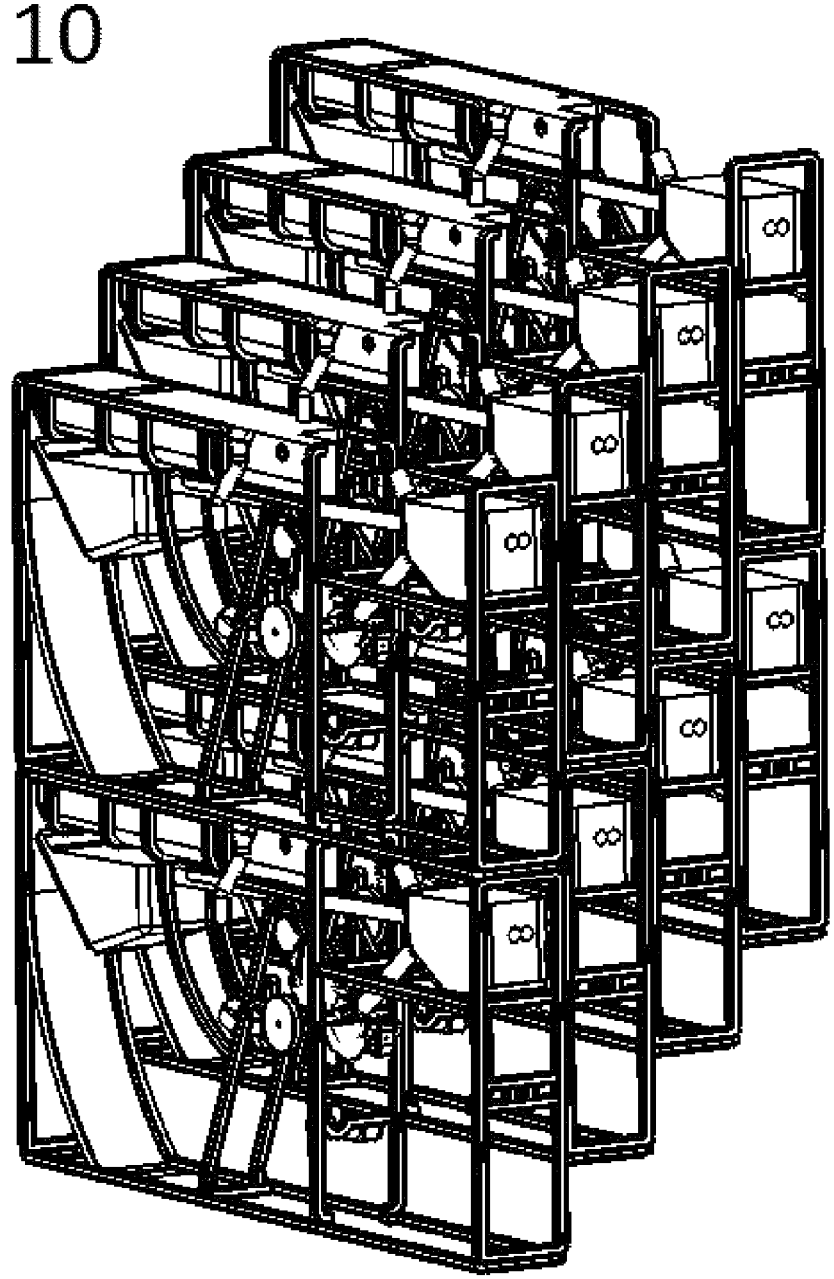
FIG. 10 is a side view showing 8 units, 4 wide, stacked two high.

When the first container 16 is lifted, it can dump its water out its spout into the holding tank of a second unit above and over from it (see FIG. 8). A leaf spring 22 may be used to catch the main pipe 12 at the end of its pivot drop. This pivot can be used to drive mechanical devices, such as a hydraulic pump 30, an electric generator 28, and an air compressor 32, for example. These devices may be driven from gears 24 and a flywheel 26 to keep power more constant.

Other items on the units may include a safety latch 34 for keeping the device from pivoting, and hydraulic and electrical lines as may be necessary for the various mechanical devices. The system of the present invention includes appropriate framework and is designed to hold an enormous amount of weight.

As shown in FIG. 8, multiple units may be arranged in a row. A large number of these units, for example, from about 100 to about 5,000, may be arranged to form a power plant site, for example.

To start building the power plant of the present invention, a frame should be first constructed. The front, bottom and back frame may be attached together by, for example, a plurality of bolts and nuts, welding, or the like. Then, the two A-frames and the vertical middle frame may be attached to the bottom frame. Next, the catch plate may be attached to the bottom frame. Then, the pump assembly, which includes gears, flywheels and any pump or motor in between the two A-frames, may be attached to the unit. Next, the first and second containers 16 and 18 may be fluidly connected to the main pipe 12. The main pipe 12 will then attach to its pivot points in the A-frames. The horizontal middle frame can be attached between the front frame and the vertical middle frame. Now, the top frame, along with the holding tank 10 and holding tank support bars can be attached into the top of the unit. At this point, the fill pipe 14, overflow pipe, dump pipe, magnet and leaf spring can be assembled in position. Of course, other assembly methods and materials may be used to create the units of the present invention without departing from the scope of the present invention.

It should be understood, of course, that the foregoing relates to exemplary embodiments of the invention and that modifications may be made without departing from the spirit and scope of the invention as set forth in the following claims.

What is claimed is:

1. A water driven power plant unit comprising:
a frame;
a holding tank receiving flowing water;
a first container receiving flowing water from the holding tank through a fill pipe;
a second container receiving flowing water from the first container through a main pipe after the first container is filled, the main pipe connecting the first container with the second container;
wherein the main pipe is pivotally connected to the frame and operable to permit the first container and the second container to pivot;
one or more mechanical devices driven by the pivoting of the first and second containers, wherein
the second container is releasably retained to an underside of the frame until a predetermined amount of water flows into the second container, causing the first and second containers to pivot and the first container to spill to an elevated location above the water driven power plant unit.

2. The water driven power plant unit of claim 1, wherein the one or more mechanical devices includes at least one of an electric generator, a hydraulic pump and an air compressor.

3. The water driven power plant unit of claim 1, further comprising a catch plate operable to retain water in the second container during pivoting of the first and second containers.

4. The water driven power plant unit of claim 1, further comprising a leaf spring disposed to catch the main pipe at a pivot of the first and second containers.

5. The water driven power plant unit of claim 1, further comprising at least one flywheel turning operable to keep power output of an electric generator connected thereto constant.

* * * * *